United States Patent Office 2,805,204
Patented Sept. 3, 1957

2,805,204
ABSORBENT SWEEPING COMPOSITION
George Howard Adams, Jr., Center Valley, Pa.
No Drawing. Application June 21, 1950,
Serial No. 169,510
1 Claim. (Cl. 252—88)

The present invention relates to absorbent sweeping compositions for use in removing various kinds of oil, grease and sticky substances, whether liquid or semi-solid, from floors and other surfaces.

An important object of the invention is to provide a composition of the character indicated while will be highly efficient for its intended purposes, economical to manufacture, easy to store, package and use, and which will be non-inflammable, non-corrosive and harmless to the surfaces to which it is applied.

A related object of the invention is to put to commercial use the kiln flue dust which is at present a waste product of the Portland cement industry.

I have discovered that such kiln flue dust, which will be hereinafter more particular identified and described, can be treated in a simple and economical manner to function as, or become an important ingredient of, a composition of matter which has superior absorbent properties and is thus highly useful in cleaning floors and other surfaces of oily, greasy or sticky substances that have become coated on or even well soaked into them.

In the manufacture of Portland cement, raw materials such as limestone, cement rock, shale, clay, marl and sandstone, the principal chemical components of which are silica, alumina, ferric oxide, lime, potash and magnesia, are separately crushed, dried when necessary, stored, and pulverized to a fineness at which about 90% to 95% passes a 200 mesh sieve. The materials are then blended in various proportions according to the particular kind of cement desired, e. g., normal, moderate heat, high early strength, low heat, sulphate resisting, air-entraining, mortar, etc. A typical blended mix weight 65 to 75 lbs. per cu. ft. and is bluish gray in color.

The mix is heated in a rotary kiln to bring about chemical and physical changes and form clinker. Discharged with the products of combustion from the kiln is flue dust, which is a fine powder having, prior to the present invention, no commercial use or value so far as I know. In fact, the presence of flue dust in the kiln discharge is objectionable because it prevents free liberation of the gases into the atmosphere. The industry is put to considerable trouble and expense to separate the dust so that only relatively dust-free products of combustion are discharged. The separation is accomplished in various ways, as by electrical precipitation of cyclone separators, and the dust is hauled away and discarded in dumps as waste.

The dumps are exposed to the atmosphere and to the elements, and the flue dust in them becomes weathered, which produces chemical and physical changes in the dust. Thus, a typical fresh flue dust analysis of

| | Percent |
|---|---|
| $SiO_2$ | 18.0 |
| $Al_2O_3$ | 6.9 |
| $Fe_2O_3$ | 3.8 |
| CaO | 45.3 |
| MgO | 2.8 |
| $SO_3$ | 7.1 |
| $K_2O$ | 2.5 |
| Loss on ignition at 1650° F. | 13.6 | may be found, after three to six months or more of weathering, to have an analysis of

| | Percent |
|---|---|
| $SiO_2$ | 13.3 |
| $Al_2O_3$ | 5.1 |
| $Fe_2O_3$ | 2.8 |
| CaO | 34.2 |
| MgO | 2.0 |
| $SO_3$ | 5.2 |
| $K_2O$ | 1.0 |
| Water and volatile at 220° F. | 13.7 |
| Loss on ignition at 1650° F. | 22.6 |

It is this weathered flue dust, having more or less the composition last above stated, that I prefer to use as the principal ingredient of my product.

It is to be understood that the foregoing analyses are typical and that the formulas are not critical. The ingredients and proportions will vary somewhat in relation to different plants and different conditions of plant operation, choice of raw materials and circumstances and duration of weathering.

Weathering produces hydration. This includes addition of water of composition and also hygroscopic water, i. e., water which is very loosely held at the surfaces of the particles. The loss on ignition of the weathered material includes all the water that did not pass off at 220° F. It includes also practically all the $CO_2$ and all or some of the $SO_3$ depending on the length of time the material is heated. Thus, $CaSO_4$, $MgSO_4$ and $K_2SO_4$ may show little loss of $SO_3$, and $K_2CO_3$ may show little loss of $CO_2$.

Upon weathering, the flue dust becomes loosely cemented. In the practice of my process the weathered material is crushed to pass a 5 mesh sieve so as to produce a particle size appropriate for brushing or sweeping over a surface to be cleaned, and then mixed with small quantities of Portland cement and, if desired, a mineral oxide pigment. I prefer to mix these ingredients in substantially the following proportions:

| | Lbs. |
|---|---|
| Weathered flue dust | 91.5 |
| Portland cement | 8.0 |
| Pigment | 0.5 |

The pigment may be any of the coloring agents commonly used with Portland cement, e. g., cobalt oxide for blue, brown oxide of iron for brown, synthetic yellow oxide of iron for buff, chromium oxide for green, red oxide of iron for red, or black iron oxide or Germantown lampblack for gray or slate effects. The pigment is substantially inert in my product, but it is useful and desirable because it helps to prevent tracking, and of course it results in a more uniformly colored finished product.

When pigment is omitted, the foregoing formula should be revised to add the pigment weight (0.5 lb.) to the weathered flue dust weight, making the latter 92 lbs.

Water is sprayed onto this composition and is thoroughly mixed therewith to dampen it sufficiently to cause the Portland cement and pigment to adhere to the flue dust particles. In this step of the process the particles grow somewhat in size. The mixture is allowed to set and harden for a period of twelve to twenty-four hours or longer. Then the mixture is dehydrated, as by processing it in a rotary dryer, after which it is preferably screened to pass a 5 mesh sieve and be retained on an 80 mesh sieve. The particles larger than 5 mesh are returned for crushing to become an ingredient of another batch, and the fines which pass the 80 mesh sieve are returned for mixture with weathered dry flue dust for use in a succeeding batch.

The final product, that which passes a 5 mesh sieve and is retained on an 80 mesh sieve, has a loosely packed weight of about 35 lbs. per cu. ft. It is used by strewing or spreading the particles on the surface to be cleaned, in a depth dependent on the quantity of oil, grease or other foreign matter which is to be removed. The composition is then swept or brushed over and through the foreign matter until the latter becomes fully absorbed thereby. If the composition appears to reach the limit of its absorptive capacity and foreign matter still remains on or in the surface, the composition is removed, as by sweeping it up, and fresh composition is applied. This is continued until all or substantially all of the foreign matter is absorbed and removed with the composition.

The weathering which has been described is an important step in the process inasmuch as I have found that fresh flue dust, newly discharged from the kiln, does not give good results when used as an ingredient in my composition. However, the weathering need not be practiced by exposing the dust to the action of rain and the elements, i. e., it need not be natural weathering. Entirely satisfactory results can be obtained by artificial weathering practiced by subjecting the piled flue dust to periodic alternate spraying or sprinkling with water and plowing or turning over to expose the interior of the pile to wetting and subsequent drying and to keep the material from hardening into a solid mass. This, is will be recognized, is the equivalent of natural weathering and hence is within the broad principles of the invention. In the appended claims I employ the terms "weathered" and "weathering" as broadly generic to both natural and artificial weathering.

Moreover, while I prefer to use Portland cement kiln flue dust as the basic ingredient of the composition product, since this material has the required chemical composition and is available at extremely low cost, it is possible to synthesize this ingredient by mixing together its components in substantially the number and proportions hereinabove stated.

In the foregoing specification I have disclosed the use of weathered Portland cement kiln flue dust admixed with Portland cement. This is the preferred embodiment of the invention, with or without a pigment ingredient, as has been explained. However, I have found that under some conditions, and for the removal of some substances, the weathered Portland cement kiln flue dust alone, without addition of Portland cement or pigment, is quite satisfactory. To produce this embodiment of the invention it is necessary only to grind a quantity of weathered flue dust to proper particle size for brushing or sweeping over a surface to be cleaned. The hereinabove proposed size, by which the particles will pass a 5 mesh sieve and be retained on an 80 mesh sieve, will be found satisfactory. This embodiment of the invention is to be deemed within the scope of the broader of the appended claim.

I claim:

A non-oleaginous preparation for absorbing oil, grease and the like from floors and other surfaces comprising weathered Portland cement kiln flue dust ground substantially entirely to particle size which will pass a 5 mesh sieve and be retained on an 80 mesh sieve with a thin surface coating of Portland cement adhering to the particles.

References Cited in the file of this patent

UNITED STATES PATENTS

| 678,981 | Rosenfeld | July 23, 1901 |
| 1,749,317 | Chevalier | Mar. 4, 1930 |

FOREIGN PATENTS

| 476 | Great Britain | June 1, 1905 |